US009612776B2

(12) United States Patent
Andrews et al.

(10) Patent No.: US 9,612,776 B2
(45) Date of Patent: Apr. 4, 2017

(54) DYNAMICALLY UPDATED USER DATA CACHE FOR PERSISTENT PRODUCTIVITY

(71) Applicant: Dell Products, L.P., Round Rock, TX (US)

(72) Inventors: Carlton A Andrews, Austin, TX (US); Gary Douglas Huber, Austin, TX (US); Manish Bhaskar, San Jose, CA (US); Munif Mohammed Farhan, Round Rock, TX (US); Satya Mylvara, Sunnyvale, CA (US); Todd Swierk, Austin, TX (US); William F. Sauber, Georgetown, TX (US); Philip M. Seibert, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 208 days.

(21) Appl. No.: 14/144,751

(22) Filed: Dec. 31, 2013

(65) Prior Publication Data
US 2015/0186076 A1 Jul. 2, 2015

(51) Int. Cl.
*G06F 3/06* (2006.01)
*G06F 12/02* (2006.01)
(Continued)

(52) U.S. Cl.
CPC .......... *G06F 3/0685* (2013.01); *G06F 3/0614* (2013.01); *G06F 3/0655* (2013.01); *G06F 9/50* (2013.01); *G06F 12/084* (2013.01)

(58) Field of Classification Search
CPC .. G06F 3/067; G06F 11/1456; G06F 11/1448; G06F 11/1464; G06F 11/2094; G06F 17/30126; G06F 17/30194; G06F 17/30203; G06F 11/2089; G06F 17/30091; G06F 17/301; G06F 11/1469; G06F 17/30132; G06F 17/30159; G06F 17/30215; G06F 3/0635; G06F 11/1466; G06F 17/30073; G06F 17/30165; G06F 21/31;
(Continued)

(56) References Cited

U.S. PATENT DOCUMENTS

| 6,542,926 B2 * | 4/2003 | Zalewski ............. G06F 9/5077 709/213 |
| 7,430,686 B1 * | 9/2008 | Wang .................. G06F 11/1417 714/6.3 |

(Continued)

*Primary Examiner* — Tuan Thai
*Assistant Examiner* — Edward Waddy, Jr.
(74) *Attorney, Agent, or Firm* — Fogarty LLC

(57) ABSTRACT

The present embodiments describe systems and methods for a dynamically updated user data cache for persistent productivity. In an embodiment, the system includes caching mechanism optimized to support user productivity in the case of a primary storage failure. For example, an embodiment of a method includes establishing a cache for caching user data in a persistent data storage device that is accessible by a first operating system and a second operating system. The method may also include identifying a set of user data to be stored in the cache. Additionally, the method may include storing the set of user data into the cache. The method may also include accessing the set of user data stored in the cache with the second operating system in response to the first operating system being in a degraded condition.

17 Claims, 4 Drawing Sheets

(51) Int. Cl.
*G06F 12/08* (2016.01)
*G06F 12/084* (2016.01)
*G06F 9/50* (2006.01)

(58) Field of Classification Search
CPC ............... G06F 3/0622; G06F 11/1458; G06F 11/3438; G06F 2221/2141; G06F 3/0604; G06F 3/0629; G06F 3/065; G06F 11/1451; G06F 11/1461; G06F 11/1662; G06F 11/1666; G06F 11/2082; G06F 12/0246; G06F 12/0868; G06F 17/30085; G06F 17/30581; G06F 21/552; G06F 2212/222; G06F 12/0804; G06F 3/0613; G06F 3/0619; G06F 3/0644; G06F 3/0679; G06F 2212/1008; G06F 9/4406; G06F 21/575; G06F 11/1417; G06F 21/57; G06F 17/3007; G06F 21/56; G06F 2212/2022; G06F 11/2064; G06F 11/2079; G06F 12/0871; G06F 1/24; G06F 11/1438; G06F 11/3466; G06F 12/084; G06F 12/0877; G06F 21/00; G06F 21/564; G06F 21/60; G06F 21/74; G06F 21/78; G06F 2212/69; G06F 3/0614; G06F 11/165; G06F 11/1658
USPC .......... 711/162, E12.001, E12.103, E12.002, 711/165, 100, 111, 112, 113, 150, 154, 711/161, 147, E12.008, E12.022, 711/E12.082, 105, 118, 133, 141, 144, 711/145, E12.038, 130, 158, 163, 3, 103, 711/104; 709/213, 201, 238, 212, 227, 709/230; 1/1; 713/2, 100, 165, 166, 167, 713/187, 188, 189, 193; 726/23, 27, 25; 714/E11.133, E11.179, 47.1, 48; 365/185.33

See application file for complete search history.

(56) References Cited

U.S. PATENT DOCUMENTS

| | | | | |
|---|---|---|---|---|
| 7,657,652 | B1 * | 2/2010 | Balaji | G06F 17/30902 709/201 |
| RE42,860 | E * | 10/2011 | Velez-McCaskey | G06F 3/0601 707/822 |
| 2005/0273565 | A1 * | 12/2005 | Hirakawa | G06F 11/2058 711/162 |
| 2006/0212736 | A1 * | 9/2006 | Kimura | G06F 1/3203 713/323 |
| 2009/0119455 | A1 * | 5/2009 | Kisel | H04L 67/104 711/118 |
| 2010/0318745 | A1 * | 12/2010 | Wheeler | G06F 17/30902 711/136 |
| 2012/0030440 | A1 * | 2/2012 | Miwa | G06F 3/0607 711/162 |
| 2014/0250322 | A1 * | 9/2014 | Fleischmann | G06F 12/0246 714/6.22 |

* cited by examiner

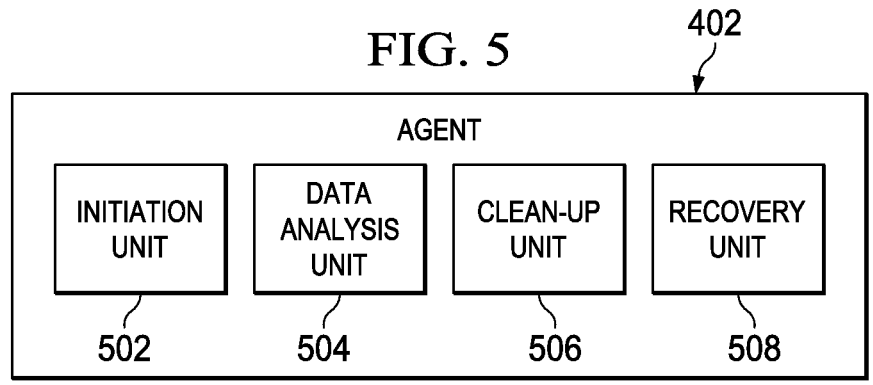
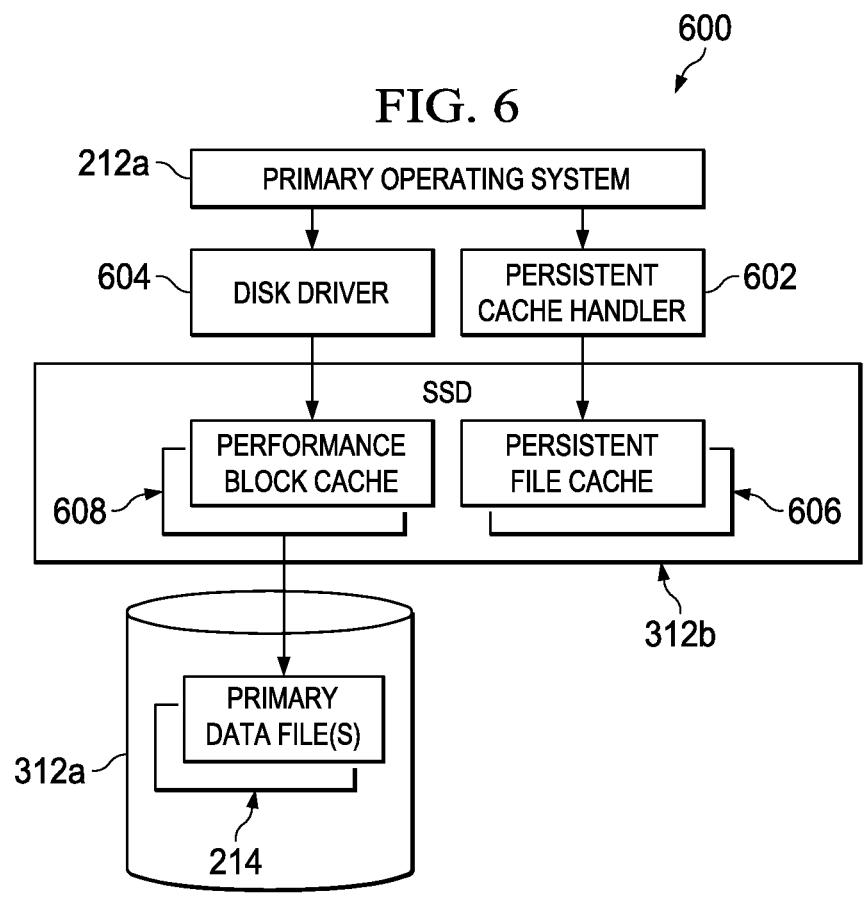

DYNAMICALLY UPDATED USER DATA CACHE FOR PERSISTENT PRODUCTIVITY

FIELD

This disclosure relates generally to computer systems, and more specifically, to a dynamically updated user data cache for persistent productivity.

BACKGROUND

It is valuable to a computer user to have complete and usable copies of the most recently accessed data files in the event of a primary disk failure. As used herein, the term "accessed" means created, modified, read, or written. Other user data may be backed up elsewhere, perhaps at home or in an office, but the most recently accessed files or most commonly accessed files are often the most important files to a user from a productivity perspective. While it is possible to recover these important files from an external backup copy, this may not be the best solution. For example, a recently accessed file may be modified or updated, and the modifications or updates may not be reflected in the backup copy. Another issue is time. It may take time to locate a backup device, such as an external hard drive or an external flash drive. Additionally, the backup copies may be located at a physically remote location. For example, if a user is travelling, but the backup is stored in his or her office, then the backup copy may not be accessible until the user returns to the office.

Hybrid disk drives (or other flash based disk performance enhancing systems) have flash based storage as well as rotating physical disk storage. One use of the flash storage is to cache the most frequently used disk blocks in order to provide faster access to files that are most often read from the disk. This can speed read access from the drive for files often read. This is particularly effective for system data such as those used often to boot a PC, applications frequently used or frequently accessed user data. Another use of the flash portion of a hybrid drive is to act as a write-through cache so writes to the disk occur opportunistically from the cache to the spinning media enhancing overall write performance of the system. These transactions are performed at a very low level to optimize performance. The cache/disk subsystem does not need to be aware of the grouping of the blocks into particular files, just the fact that a block has passed through the cache either recently or often. The subsystem keeps track of the association of the block in cache to the identical content block on the spinning disk but not association of which file contains that block. The grouping of multiple blocks into a file is maintained independently by the host operating system. In the event of the failure of the primary disk, this file level association is lost.

Part of the flash cache could also be used to store copies of user data that is often or recently used. This data could be extremely valuable to a user if the primary storage, such as a spinning magnetic disk, becomes inoperable. The read/write cache described above for performance enhancement may have a portion of this data, but may not have all the disk blocks that make up a given file. The blocks that pass through the cache are indicators of the files that are being accessed by the operating system. Many of these blocks are elements of user data files but may not be complete files. Also, a user data file could be opened for read or write access and only a single block read or written in which case the whole file did not pass through the performance cache.

SUMMARY

The present embodiments describe systems and methods for a dynamically updated user data cache for persistent productivity. In an embodiment, the system includes caching mechanism optimized to support user productivity in the case of a primary storage failure. For example, an embodiment of a method includes establishing a cache for caching user data in a persistent data storage device that is accessible by a first operating system and a second operating system. The method may also include identifying a set of user data to be stored in the cache. Additionally, the method may include storing the set of user data into the cache. The method may also include accessing the set of user data stored in the cache with the second operating system in response to the first operating system being in a degraded condition.

As part of the backup of the most recently used files, security policies of the first operating system and primary storage device may also be honored. For example, if the main storage drive was encrypted, the persistent flash cache containing the most recent data may also be encrypted. If the desktop is used by multiple users, the security across the users may be maintained as well.

In an embodiment, the method may include running an agent application on the first operating system and/or the second operating system. The agent application may be configured to carry out one or more operations for establishing the cache, identifying the set of user data, storing the set of user data, and accessing the set of user data.

In an embodiment, the method may also include identifying a storage location for the cache. The method may also include determining an initial set of user data to be stored in the cache. Alternatively, the cache may be empty initially. The method may further include assigning one or more weight values to user data in response to one or more parameters associated with the user data. In such an embodiment the method includes identifying the set of user data to be stored in the cache in response to the one or more weight values associated to the user data. The method may also include removing user data from the cache to create space for new user data to be stored in the cache in response to removal criteria.

Embodiments of an Information Handling System (IHS) are also presented. In one such embodiment, the IHS includes a processor. The IHS may also include a memory coupled to the processor. The memory may include program instructions stored thereon that, upon execution by the processor, cause the IHS to perform one or more operations. The processor may be configured to establish a cache for caching user data in a persistent data storage device that is accessible by a first operating system and a second operating system, identify a set of user data to be stored in the cache, store the set of user data into the cache, and access the set of user data stored in the cache with the second operating system in response to the first operating system being in a degraded condition.

In an embodiment, the program instructions further comprise a policy. The policy may be a cache initiation policy configured to identify a storage location for the cache and to reference for determining an initial set of user data to be stored in the cache. The policy may also be a data caching policy configured to establish criteria for identifying the set of user data to be stored in the cache. In an embodiment, the policy specifies one or more weight values to be assigned to user data in response to one or more parameters associated with the user data. The policy may also include criteria for removing user data from the cache to create space for new user data to be stored in the cache.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 5 is a schematic block diagram illustrating one embodiment of a persistent cache handler agent.

FIG. 6 is a software stack diagram illustrating one embodiment of a computer system for a dynamically updated user data cache for persistent productivity.

DETAILED DESCRIPTION

The present embodiments describe an intelligent persistent cache handler that will track file usage and maintain copies of the most relevant files in a persistent cache for the user in event of a total loss of the primary storage device. What is unique about this caching algorithm is that it will examine the user behavior and look for files the user is likely to want again in the near future. This includes referenced files the user is reading but did not create. Email attachments or other files accessed in read mode are examples of this type of file. Any files the user may be editing or creating may also be identified. The present embodiments may maintain the cache without interfering with user productivity. The present embodiments may also maintain the state of the cache and prune less important files to leave room for future additions.

Figure 1:
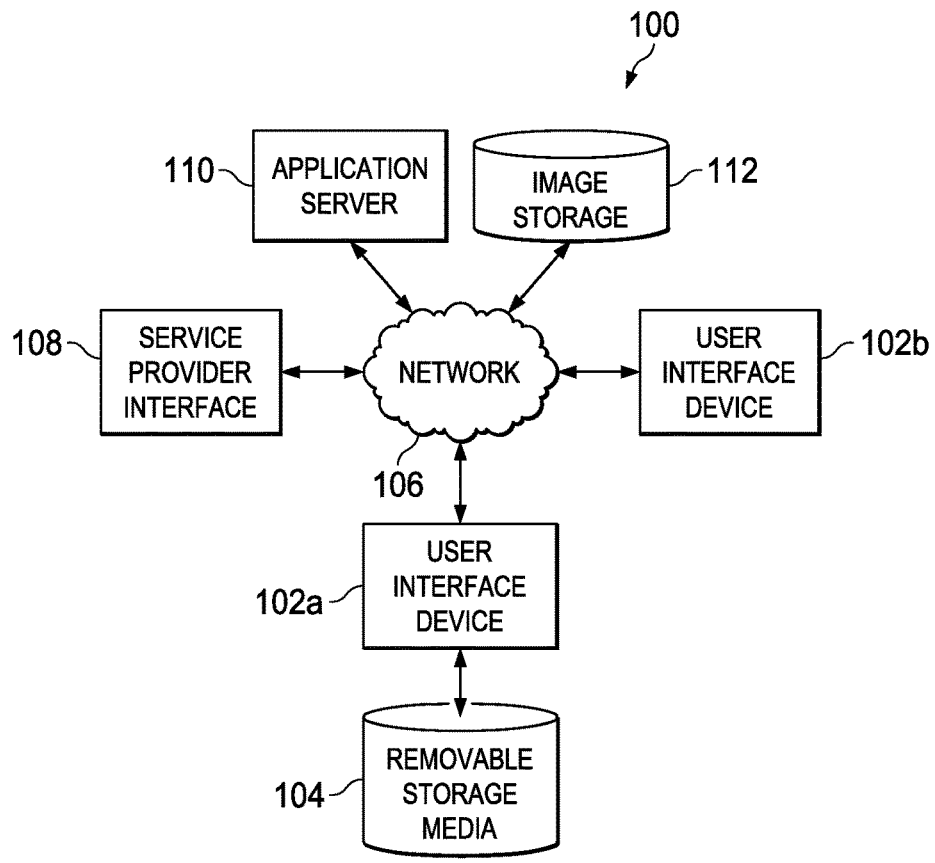
FIG. 1 is a diagram illustrating one embodiment of a system for a dynamically updated user data cache for persistent productivity.

FIG. 1 is a diagram illustrating one embodiment of a system 100 for a dynamically updated user data cache for persistent productivity. In an embodiment, the system 100 includes one or more user interface devices 102*a-b*. The user interface devices 102*a-b* may be computing devices, such as desktop computers, laptop computers, tablet computing devices, mobile computing devices, etc. In other embodiments, the user interface devices may include or be coupled to servers, networking devices, security appliances, or the like. In still other embodiments, the user interfaces may be of diverse types. For example, a first user interface device 102*a* may be a desktop workstation, and a second user interface device 102*b* may be a mobile computing device or a tablet computing device. In certain embodiments, aspects of the first user interface device 102*a* may be tied or related to aspects of the second user interface device 102*b*. For example, a selection of a user's files, accounts, configuration, applications, etc. may be shared between the first user interface device 102*a* and the second user interface device 102*b*. One of ordinary skill will recognize a variety of user interface devices 102*a-b* that may be configured according to the present embodiments.

In an embodiment, the system 100 may include a removable storage medium 104 which may store information used by the user interface device 102*a*. Examples of removable storage media 104 include flash memory drives, Secure Digital (SD) cards, optical storage disks, external magnetic disk drives, external Solid State Drives (SSD), etc. In an embodiment, the removable storage media 104 may communicate with the user interface device 102*a* through a data communication port, such as a Universal Serial Bus (USB) port, or the like. Alternatively, the removable storage media 104 may communicate with the user interface device 102*a* wirelessly through, e.g., a WiFi or Bluetooth communication interface.

User interface devices 102*a-b* may be configured to communicate via an interface to network 106. Network 106 may include a Local Area Network (LAN), a Wide Area Network (WAN) connection, a connection to the Internet, etc. The network 106 may include various components, such as network routing devices, network switching devices, network hubs, network firewalls, wireless access points, mobile data connections, telecommunications network backbone hardware, etc. In various embodiments, the network 106 may be configured to receive communication requests from the user interface devices 102*a-b* and transmit responses from other devices connected to the network 106 back to the user interface devices 102*a-b*.

In an embodiment, the system 100 may include one or more devices or subsystems which may be provided to service the user interface devices 102*a-b*. For example, service provider interface 108 may be provided to allow a service provider to communicate with the user interface device 102*a*. In one example, embodiment, the service provider may be a technical support technician. The technical support technician may establish a user support session, such as a chat session with a user of the user interface device 102*a, b*. The user support session may additionally include a remote access session, a file transfer session, a voice or video connection, etc. In an embodiment, the user support session may be requested by the user of the user interface device 102*a, b*. In another embodiment, the user interface device 102*a, b* may automatically request the user support session in response to encountering a system error.

In an embodiment, the system 100 may also include an application server 110. In such an embodiment, the application server 110 may provide the user interface devices 102*a-b* with access to one or more applications 110. For example, the user interface device 102*a-b* may operate as a thin client which displays video related to operations of an application hosted by application server 110, but does not directly handle processing of data associated with operation of the application. In a further embodiment, the user interface device 102*a-b* may additionally provide an interactive interface allowing the user to enter data or manipulate operation of the application. Data and commands entered by the user at the user interface device 102*a, b* may be communicated to application server 110 via network 106.

In one example, the application server 110 may be accessed by the user interface device 102*a, b* in the event of a failure being detected at the user interface device 102*a*. For example, in the event of a system failure of an operating system, the user interface device 102*a, b* may automatically switch to a fault recovery mode. In the fault recovery mode, the user interface 102*a* may still be used by the user to perform tasks, but the operating system may be operated on the application server 110 and the user interface device 102*a* may simply operate as a user interface client of the application server 110 allowing the user to enter inputs which are communicated to the application server 110 via network 106, and seeing responsive actions of the operating system on the application server 110. One of ordinary skill will recognize additional examples involving applications which may be hosted by application server 110, including word processing applications, email applications, photo editing applications, etc.

In an embodiment, image storage 112 may provide remote storage functionality for user interface device 102*a*. In one embodiment, the image storage 112 may store a complete image of the data stored on user interface device 102*a, b*. In another embodiment, the image storage 112 may store a partial image of data stored on the user interface device 102*a, b*. For example, a selection of files or folders stored on the user interface device 102*a* may be designated for storage on the image storage 112. In such an embodiment, the files or folders may be communicated to image storage 112 via network 106 for storage. In still another embodiment, incremental changes to information stored on the user interface device 102*a* may be communicated to image storage device 112, such that the copies of information stored on image storage 112 are synchronized with the information stored on user interface device 102*a*.

Figure 4:
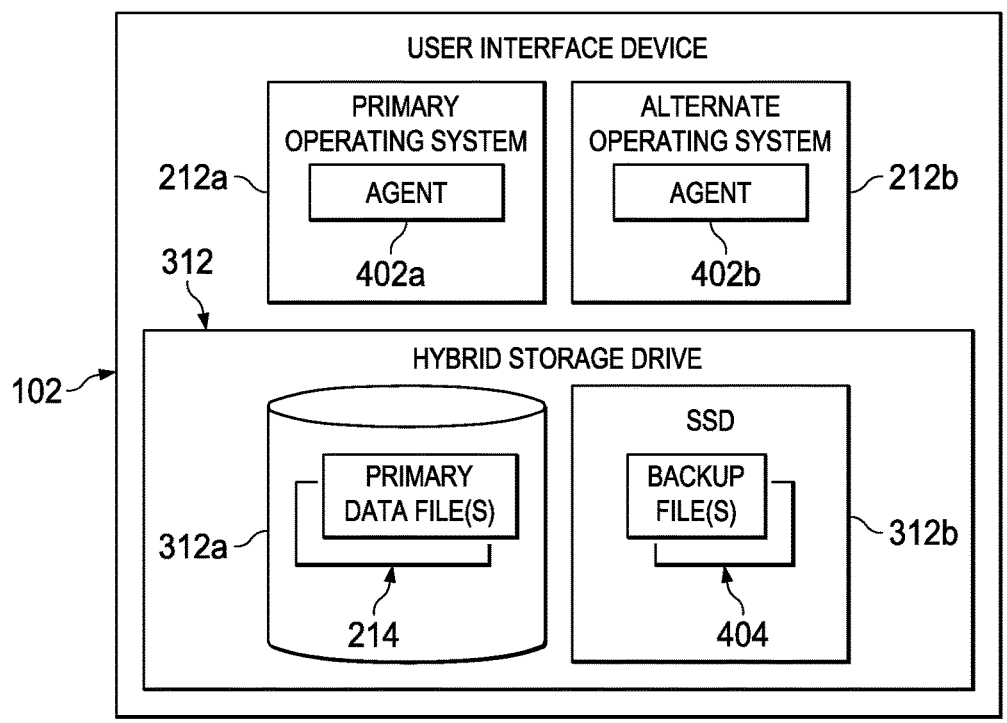
FIG. 4 is a diagram illustrating an embodiment of a user interface device configured for persistent productivity.

The system 100 of FIG. 1 is just one example of a possible system which may be used according to the present embodiments. Certain components of system 100 may be added or omitted without substantial change to the fundamental operation of the system. For example, while it may be useful to include a removable storage media 104, this component of system 100 may be omitted in various embodiments. Similarly, a user interface device 102 may access an application server during a user support session, but this component of system 100 may also be omitted in various embodiments. Additionally, image storage 112 may be useful to a service technician during a user support session, but this component may also be omitted in various embodiments. One of ordinary skill will also recognize that certain components may be added to system 100, for example as shown in FIG. 4.

Figure 2:
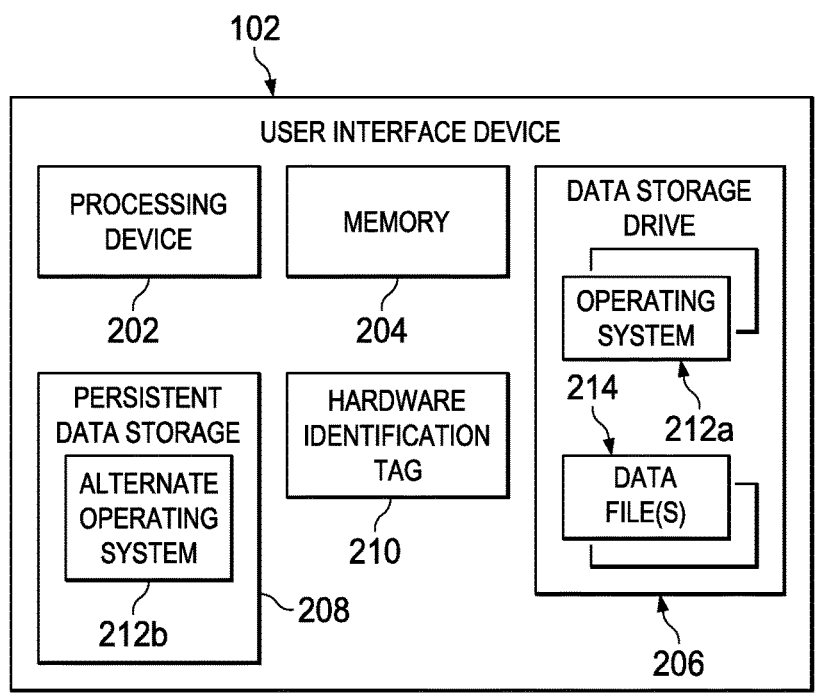
FIG. 2 is a diagram illustrating one embodiment of a user interface device configured for persistent productivity.

FIG. 2 is a diagram illustrating one embodiment of a user interface device 102 configured for a dynamically updated user data cache for persistent productivity. In an embodiment, the user interface device 102 may include a processing device 202, a memory 204, a data storage drive 206, a persistent data storage 208, and a unique identifier 210. In various embodiments, the unique identifier 210 may be a hardware identification tag, a system-specific service tag, etc. One of ordinary skill will recognize alternative embodiments of a user interface device 102. For example, in certain embodiments the user interface device 102 may omit certain elements described in FIG. 2, or may add certain additional elements not described in FIG. 2.

In an embodiment, the processing device 202 may execute programmed instructions stored in the memory 204 or the data storage drive 206. For example, the data storage drive may store program code associated with a first operating system 212. Portions of the code for the first operating system 212 may be loaded by the processing device 202 into the memory 204. In an embodiment, the first operating system is a Windows® operating system available from Microsoft® Corporation. Additionally, the processing device 202 may access data files stored in either the memory 204 or the data storage drive 206. In an embodiment, a user of the user interface device 202*a* may access data files 214 using controls provided by the operating system 212.

In certain embodiments, one or more data files 214, or the first operating system 212 may experience a fault. Faults may include hardware malfunctions or failures or software failures. In such an embodiment, the processor 202 may access code for system recovery. In a particular embodiment, the system recovery code may cause the processor 202 to load a second operating system, such as an alternate operating system 212.

Additionally, in various embodiments, the processing device 202 may store user data on a persistent data storage 208 for recovery in the event of a fault. In a particular embodiment, the persistent data storage device 208 may store recently accessed files. In another embodiment, the persistent data storage 208 may contain code for the alternate operating system 212. In such an embodiment, the alternate operating system 212 may still be accessible, even if the data storage drive is inaccessible. In still other embodiments, the persistent data storage 212 may store system configuration settings, system fault logs, system status logs, etc. In a particular embodiment, the persistent data storage 208 may be non-volatile data storage, such as flash storage. In still a further embodiment, data in the persistent data storage 208 may be accessible by removable storage media 104.

Figure 3:
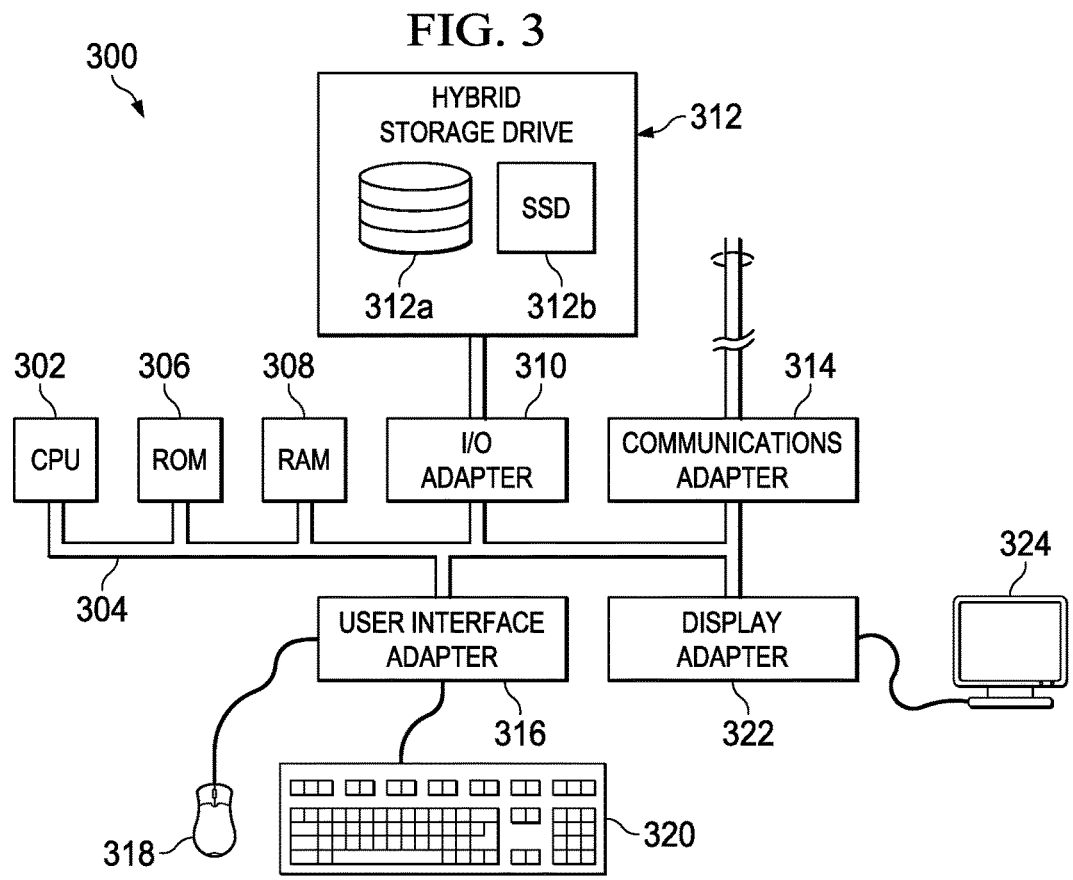
FIG. 3 is a block diagram of an example of an Information Handling System (IHS) according to some embodiments.

FIG. 3 illustrates a computer system 300 adapted according to certain embodiments of a user interface device 102*a-b*, the service provider interface 108, the application server 110, and/or the image server 112. The central processing unit (CPU) 302 is coupled to the system bus 304. In an embodiment, the processing device 202 may be implemented with CPU 302. The CPU 302 may be a general purpose CPU or microprocessor. The present embodiments are not restricted by the architecture of the CPU 302, so long as the CPU 302 supports the modules and operations as described herein. The CPU 302 may execute the various logical instructions according to the present embodiments. For example, the CPU 302 may execute machine-level instructions according to the exemplary operations described below with reference to FIGS. 5-6.

The computer system 300 also may include Random Access Memory (RAM) 308, which may be SRAM, DRAM, SDRAM, or the like. The computer system 300 may utilize RAM 308 to store the various data structures used by a software application configured to maintain technical support continuity across system restarts and multiple operating systems. The computer system 300 may also include Read Only Memory (ROM) 306 which may be PROM, EPROM, EEPROM, optical storage, or the like. The ROM may store configuration information for booting the computer system 300. The RAM 308 and the ROM 306 hold user and system 100 data. In various embodiments, memory 204 of user interface device 102 may be implemented with ROM 306 and/or RAM 308.

The computer system 300 may also include an input/output (I/O) adapter 310, a communications adapter 314, a user interface adapter 316, and a display adapter 322. The I/O adapter 310 and/or user the interface adapter 316 may, in certain embodiments, enable a user to interact with the computer system 300 in order to input information for interacting with operating system 212. In a further embodiment, the display adapter 322 may display a user support session, such as a chat window.

The I/O adapter 310 may connect to one or more storage devices 312, such as one or more of a hard drive, a Compact Disk (CD) drive, a floppy disk drive, a tape drive, to the computer system 300. In a particular embodiment, the storage devices 312 may be hybrid storage drives, which include both magnetic data storage disks 312a and a SSD 312b. In other embodiments, flash memory may be substituted for the SSD 312b. The SSD 312b may comprise the persistent data storage 208, which in one embodiment, may store code for the alternate operating system 212. The communications adapter 314 may be adapted to couple the computer system 300 to the network 106, which may be one or more of a LAN and/or WAN, and/or the Internet. The user interface adapter 316 couples user input devices, such as a keyboard 320 and a pointing device 318, to the computer system 300. The display adapter 322 may be driven by the CPU 302 to control the display on the display device 324.

The present embodiments are not limited to the architecture of system 300. Rather the computer system 300 is provided as an example of one type of computing device that may be adapted to perform the functions of a server 102 and/or the user interface device 110. For example, any suitable processor-based device may be utilized including without limitation, including personal data assistants (PDAs), computer game consoles, tablet computers, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

FIG. 4 is a diagram illustrating an embodiment of a user interface device 102 configured for persistent productivity. In an embodiment, the user interface device 102 is configured to run both a primary operating system 212a and an alternate operating system 212b. The primary operating system 212a may run a persistent cache handler agent 402a configured to establish a cache for caching user data in a persistent data storage device 208 that is accessible by both the primary operating system 212a and the alternate operating system 212b. In an embodiment, the agent 402a may also identify a set of backup files 404 to be stored in a cache located on the SSD 312b. For example, the backup files 404 may be a subset of the primary data files 214 stored on the primary storage device 312a. The agent 402a may use various criteria, as defined by one or more policies, for determining the subset of user data to include in the backup files 404. In such an embodiment, the agent 402a may store the set of backup files into the cache located on the SSD 312 or other persistent storage device.

Under various use cases or operational conditions, the primary operating system 212a or the primary storage device 312a may experience a fault, error, or other degradation in performance. For example, a user may inadvertently install malicious software which affects system performance. In another embodiment, the primary storage device 312a may become damaged or corrupted. In such embodiments, the primary operating system 212a may not be operable, or may shut down for remediation processes. In order to allow the user to continue to be productive during the remediation or in response to the failure, the alternate operating system 212b may be loaded and run on the user interface device 102. In a particular embodiment, program code for the alternate operating system may be stored on a persistent storage device 208, such as SSD 312b. In such an embodiment, the alternate operating system may also run a persistent cache handler agent 402b. In an embodiment, the agent 402b may perform substantially the same operations as the agent 402a run on the primary operating system 212a.

In a further embodiment, the agent 402b may also access the set of user data stored in the cache system in response to the primary operating system 212a being in a degraded condition.

In an embodiment, the persistent data storage device 208 is the SSD 312b portion of the hybrid storage drive 312. In another embodiment, the persistent data storage device 208 may be a flash memory device. A flash memory device may be accessible via an access port such as a PCMCIA slot, an Secure Digital (SD) card slot, MultiMedia Card (MMC) slot, or the like. In still other embodiments, the persistent data storage 208 may be a removable storage device such as a Universal Serial Bus (USB) accessible flash drive.

In the embodiment described in FIG. 4, the alternate operating system 212b may also run an agent application 402b. Agent application 402b may be used by the alternate operating system 212b to access the backup files 404 stored in the SSD 312b. In such an embodiment, the alternate operating system 212b may also reside on a persistent data storage device 208. In an embodiment, the backup files 404 may be stored on the same persistent data storage device 208 as the alternate operating system 212b. Alternatively, the backup files 404 may reside in a different persistent data storage device 208 as the alternate operating system 212b.

FIG. 5 is a schematic block diagram illustrating one embodiment of a persistent cache handler agent 402. In an embodiment, the agent 402 may include an initiation unit 502, a data analysis unit 504, a clean-up unit 506 and/or a recovery unit 508. Some embodiments of the agent 402 may include all of these units. Other embodiments may only include a selection of these units. For example, an embodiment of the agent 402a running on the primary operating system 212a may only include the initiation unit 502, the data analysis unit 504 and the clean-up unit 506. Similarly, an embodiment of the agent 402b running on the alternate operating system may be configured as a lite agent and may only include the recovery unit 508. Of course one of ordinary skill will recognize various combinations of these units which may be used in various embodiments of the agent 402.

When the agent 402 is instantiated the initiation unit 502 may locate a policy file or guide, which will indicate where the backup files 404 are to be stored (storage location, URL, etc). For example, the backup files 404 may be stored in a persistent file cache 606 on the SSD 312b as shown in FIG. 6. The initiation unit 502 may examine the cache 606 for proper formatting to determine if there is existing data in the cache 606 with a functional database describing the data. If so, the initiation unit 502 can resume a normal run time state. If not the cache handler may prepare the cache for initial state use by formatting (blanking) the storage space and then creating the initial file structure and database.

During normal run time the data analysis unit 504 may observe the files which the user accesses. These may be files that are created as original, modified, read, email attachments opened, autosave backup files created by applications, etc. The data analysis unit 504 may compare the file type to the policy guide to determine if the file type should be saved in the persistent cache 606. If the file is of appropriate type to be saved, then the contents of the file will be copied along with descriptive information about the file and the type of access. Decisions will be made according to policy, file access and file access type to provide an appropriate weighting of relative importance to having the file available in cache. In embodiments where multiple files are accessed, a priority for storage in the persistent file cache 606 may be assigned according to the weighting assigned to the file.

Weighting factors may include whether the file was newly created or merely read, whether the file was modified during use, the frequency of user access, the duration of user access, etc. In such an embodiment, these various factors may be assigned weights or scores and then an aggregate or cumulative score may be assigned to the file.

If, during normal run time, there is not enough room to store new data files, then the clean-up unit 506 may be called. The clean-up unit 506 may also be called opportunistically during normal run time to help keep enough space available for future storage of files in cache 606. The clean-up unit 506 may check the policy for high and low watermark storage used sizes. If the cache 606 is full beyond the high watermark size, the clean-up unit 506 may clear files and their database attributes until the storage size is below the low watermark size. In such an embodiment, the clean-up unit 506 may re-evaluate the access weight of the files 404 stored within the cache 606 based on their most recent access times, dates and weights. The clean-up unit 506 may rewrite the relative weighting of any file 404 as necessary and build a temporary table of file priority. The agent 402 may then delete all files of no priority and those of lowest priority until the used cache space falls below the low watermark level.

In the event of failure of the primary operating system 212a or primary storage 312a the backup copies of important user data may be accessible in the persistent file cache 606. For example, the alternate operating system 212b may be booted to allow the user to access this data via agent 402b. In another embodiment, a backup of the primary operating system 212a might be reloaded and the user data copied back from cache 606 to the primary storage 312a to refresh the user data with the most recent copies of files. In another embodiment, the alternate operating system 212b may be loaded in order to access the recent data and copy it from the persistent file cache 606 to a removable storage such as a USB flash drive. In this way the data can be transferred to another working machine. In still another embodiment, the alternate operating system 212b may be loaded and have enough capability that the user can continue to be productive by utilizing the backup copies 404 of files as if they were the primary copies. In another embodiment, an alternate operating system 212b may be streamed in an on-demand-desktop-streaming (ODDS) environment, for example from application server 110 and have enough capability that the user can continue to be productive by utilizing the backup copies 404 of files as if they were the primary copies. In still a further embodiment, an alternate operating virtualized environment (VDI) may be accessed which could have mounted access to the cache 606 and have enough capability that the user can continue to be productive by utilizing the backup copies 404 of files as if they were the primary copies.

FIG. 6 is a software stack diagram illustrating one embodiment of a computer system for a dynamically updated user data cache for persistent productivity. As described above, under normal operating conditions, the primary operating system 212a may store primary data files 214 in a primary data storage device 312a, such as a magnetic disk drive. To do this, the primary operating system 212a may run a disk driver 604 which is configured to handle storage of the primary data files 214. The disk driver 604 may store part of the primary data files 214 in a performance block cache 608. The performance block cache 608 may be stored on an SSD 312b storage module of a hybrid storage device in one embodiment. The primary data files 214 may them be copied from the performance block cache 608 to the primary storage device 312a.

Additionally, the operating system 212a may operate a persistent cache handler 602. In an embodiment, the persistent cache handler 602 is the agent 402. The persistent cache handler 602 may identify a set of the primary data files 214 to store in a persistent file cache 606 as backup files 404. In an embodiment, the persistent file cache 606 may also be stored on an SSD 312b portion of a hybrid storage drive 312.

Figure 7:
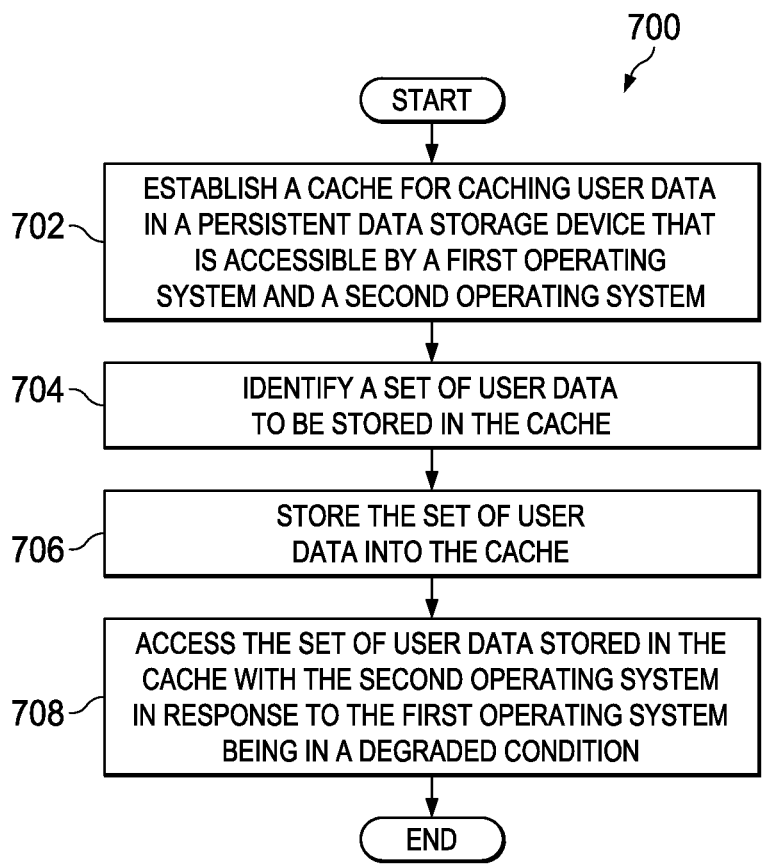
FIG. 7 is a flowchart diagram illustrating one embodiment of a method for a dynamically updated user data cache for persistent productivity.

FIG. 7 is a flowchart diagram illustrating one embodiment of a method 700 for a dynamically updated user data cache for persistent productivity. In an embodiment, the method 700 starts when the primary operating system 212a runs agent 402a. The agent 402a may initialize a persistent file cache 606 on an SSD 312b portion of a hybrid storage drive 312 as shown at block 702. The agent 404a may then identify a set of primary data files 214 to be backed up in the persistent file cache 606 as shown at block 704. For example, the agent 402a may access a storage policy and assign weights to the primary data files according to one or more usage parameters. The agent 402a may then store the backup files 404 in a persistent file cache 606 on the SSD 312b as shown at block 706.

In response to a performance degradation of either the primary operating system 212a or the primary storage device 312a, the primary operating system 212a may be shut down and an alternate operating system 212b may be loaded. The alternate operating system 212b may run a second instance of an agent 402b. The agent 402b may access the backup copies 404 in the persistent file cache 606 and make them available to the user as shown at block 708.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
providing a first Operating System (OS) to a user of an Information Handling System (IHS), wherein the IHS includes a hybrid drive having a magnetic storage portion and a flash storage portion;
establishing a persistent cache in the flash storage portion that is accessible by the first OS;
while the user is operating the first OS, assigning a weight value to each of a plurality of files not yet cached based on the user's behavior, including: (a) assigning a first weight value to a first file due to the first file having been newly created, assigning a second weight value to a second file due to the second file having been read only, and assigning a third weight value to a third file due to the third file having been modified during use; and (b) identifying a set of files among the plurality of files to be stored in the persistent cache based on the weight values assigned to each of the plurality of files;
storing the set of files into the persistent cache;
determining that the first OS is in a degraded condition;
in response to the determination, providing a second OS to the user, wherein the second OS has access to the persistent cache; and
allowing the user to retrieve one or more of the set of files from the persistent cache while the user is operating the second OS.

2. The method claim 1, further comprising running an agent application on at least one of the first OS and the second OS, the agent application configured to carry out one or more operations for establishing the persistent cache, identifying the set of files, storing the set of files, and accessing the set of files.

3. The method of claim 1, further comprising identifying a storage location for the persistent cache.

4. The method of claim 1, further comprising determining an initial set of files to be stored in the persistent cache.

5. The method of claim 1, further comprising removing a file from the cache to create space for a new file to be stored in the persistent cache in response to removal criteria.

6. An Information Handling System (IHS), comprising:
a processor; and
a hybrid drive coupled to the processor, the hybrid drive having a magnetic storage portion and a flash storage portion;
a memory coupled to the processor, the memory including program instructions stored thereon that, upon execution by the processor, cause the IHS to:
provide a first Operating System (OS) to a user;
establish a persistent cache in the flash storage portion that is accessible by the first OS;
while the user is operating the first OS, identify a set of files to be stored in the persistent cache based on one or more weight values assigned to each file in the set of files and prior to any file of the set of files being stored in the persistent cache, wherein a given file of the set of files is assigned a first weight if the given file has been created by the user or a second weight if the given file has been only read by the user;
store the set of files into the persistent cache;
the first OS is in a degraded condition;
in response to the determination, provide a second OS to the user, wherein the second OS has access to the persistent cache; and
allow the user to retrieve one or more of the set of files from the persistent cache while the user is operating the second OS.

7. The IHS of claim 6, wherein the program instructions are further configured to cause the IHS to run an agent application on at least one of the first OS and the second OS, the agent application configured to carry out one or more operations for establishing the persistent cache, identifying the set of files, storing the set of files, and accessing the set of files.

8. The IHS of claim 6, wherein the program instructions further comprise a policy.

9. The IHS of claim 8, wherein the policy comprise a cache initiation policy configured to identify a storage location for the persistent cache and to determine an initial set of files to be stored in the persistent cache.

10. The IHS of claim 8, wherein the policy comprise a data caching policy configured to establish criteria for identifying the set of files to be stored in the persistent cache.

11. The IHS of claim 8, wherein the policy further comprises criteria for removing a file from the persistent cache to create space for a new file to be stored in the persistent cache.

12. A non-transitory computer-readable medium having program instructions stored thereon that, upon execution by an Information Handling System (IHS), cause the IHS to:
provide a first Operating System (OS) to a user of the IHS, wherein the IHS includes a hybrid drive having a magnetic storage portion and a flash storage portion;
establish a persistent cache in the flash storage portion that is accessible by the first OS;
while the user is operating the first OS, assign a weight value to each of a plurality of files not yet cached based on the user's behavior and identify a set of files among the plurality of files to be stored in the persistent cache based on the weight values assigned to each of the plurality of files, wherein a given file of the set of files is assigned a first weight if the given file has been created by the user or a second weight if the given file has been only read by the user;
store the set of files into the persistent cache;
the first OS is in a degraded condition;
in response to the determination, provide a second OS to the user, wherein the second OS has access to the persistent cache; and
allow the user to retrieve one or more of the set of files from the persistent cache while the user is operating the second OS.

13. The non-transitory computer-readable medium of claim 12, wherein the program instructions are further configured to cause the IHS to run an agent application on at least one of the first OS and the second OS, the agent application configured to carry out one or more operations for establishing the persistent cache, identifying the set of files, storing the set of user data, and accessing the set of files.

14. The non-transitory computer-readable medium of claim 12, wherein the program instructions further comprise a policy.

15. The non-transitory computer-readable medium of claim 14, wherein the policy comprise a cache initiation policy configured to identify a storage location for the persistent cache and to determine an initial set of files to be stored in the persistent cache.

16. The non-transitory computer-readable medium of claim 14, wherein the policy comprise a data caching policy configured to establish criteria for identifying the set of files to be stored in the persistent cache.

17. The non-transitory computer-readable medium of claim 14, wherein the policy further comprises criteria for removing a file from the persistent cache to create space for a new file to be stored in the persistent cache.

* * * * *